(12) United States Patent
Nagatoshi

(10) Patent No.: US 9,261,687 B2
(45) Date of Patent: Feb. 16, 2016

(54) VARIABLE MAGNIFICATION OPTICAL SYSTEM FOR PROJECTION AND PROJECTION-TYPE DISPLAY APPARATUS

(71) Applicant: FUJIFILM Corporation, Tokyo (JP)

(72) Inventor: Yukiko Nagatoshi, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/556,530

(22) Filed: Dec. 1, 2014

(65) Prior Publication Data

US 2015/0085375 A1    Mar. 26, 2015

Related U.S. Application Data

(63) Continuation of application No. PCT/JP2013/003006, filed on May 10, 2013.

(30) Foreign Application Priority Data

May 30, 2012   (JP) ................................. 2012-123126

(51) Int. Cl.
| | |
|---|---|
| *G02B 15/14* | (2006.01) |
| *G02B 15/177* | (2006.01) |
| *G02B 13/18* | (2006.01) |
| *G02B 15/16* | (2006.01) |
| *G02B 15/20* | (2006.01) |
| *G02B 13/16* | (2006.01) |

(52) U.S. Cl.
CPC .............. *G02B 15/177* (2013.01); *G02B 13/16* (2013.01); *G02B 13/18* (2013.01); *G02B 15/16* (2013.01); *G02B 15/20* (2013.01)

(58) Field of Classification Search
CPC ...... G02B 13/18; G02B 15/177; G02B 15/16; G02B 15/20; G02B 15/00
See application file for complete search history.

(56) References Cited

U.S. PATENT DOCUMENTS

| | | | |
|---|---|---|---|
| 4,999,007 | A | 3/1991 | Aoki et al. |
| 2008/0094727 | A1 | 4/2008 | Kang et al. |

FOREIGN PATENT DOCUMENTS

| | | | | |
|---|---|---|---|---|
| JP | 01-210914 | | 8/1989 | |
| JP | 08-234100 | | 9/1996 | |
| JP | 2003-057542 | | 2/2003 | |
| JP | 2004-085979 | * | 3/2004 | ............. G02B 16/20 |
| JP | 2008-107798 | | 5/2008 | |
| JP | 2009-047722 | | 3/2009 | |
| JP | 2010-113150 | | 5/2010 | |

OTHER PUBLICATIONS

International Search Report PCT/JP2013/003006 dated Sep. 24, 2013.

* cited by examiner

*Primary Examiner* — Joseph P Martinez
(74) *Attorney, Agent, or Firm* — Young & Thompson

(57) ABSTRACT

A variable magnification optical system for projection consists of a negative lens group and a positive lens group in this order from a magnification side. A distance on an optical axis between the negative lens group and the positive lens group changes during magnification change, and an entire system substantially consists of six lenses. The negative lens group consists of a first lens including an aspheric surface and a second lens that is a negative single lens in this order from the magnification side.

14 Claims, 16 Drawing Sheets

VARIABLE MAGNIFICATION OPTICAL SYSTEM FOR PROJECTION AND PROJECTION-TYPE DISPLAY APPARATUS

CROSS-REFERENCE TO RELATED APPLICATIONS

This application is a Continuation of PCT International Application No. PCT/JP2013/003006 filed on May 10, 2013, which claims priority under 35 U.S.C. §119(a) to Japanese Patent Application No. 2012-123126 filed on May 30, 2012. Each of the above applications is hereby expressly incorporated by reference, in its entirety, into the present application.

BACKGROUND OF THE INVENTION

1. Field of the Invention

The present invention relates to a variable magnification optical system for projection and a projection-type display apparatus. For example, the present invention relates to a small-sized variable magnification optical system for projection appropriate to magnify and project rays carrying video image information from a light valve onto a screen, and to a projection-type display apparatus on which the variable magnification optical system for projection is mounted.

2. Description of the Related Art

In recent years, projection apparatuses (projection-type display apparatuses) using DMD (digital micromirror device: registered trademark) display devices instead of liquid crystal display devices, as light valves, became utilized. In the projection-type display apparatus, the DMD controls the reflection direction of light output from a light source by using rectangular micromirrors. The micromirror has high reflectance, and the inclination of the micromirror is changeable in a range of about 10 degrees or more based on a received video signal. The DMD makes projection of the video image possible by collecting only desirable reflection light on a screen. This is made possible, for example, by vertically and horizontally arranging several million or more mirrors on a substrate, and by performing digital control on all of them independently from each other. Each minor corresponds to a pixel in each video image.

The DMD display device differs from the liquid crystal display device in that illumination light does not need to be polarized. Therefore, a loss in light amount is small, and the DMD display device is excellent also in accurately expressing gradation. Hence, in the projection-type display apparatus using the DMD display device having such advantages, a lens for projection with excellent optical characteristics is requested so that sharp and highly precise images corresponding to the DMD display device are obtainable.

Further, as a demand in mobile use has increased, and the price of the projection-type display apparatus has become lower, reduction in size, weight and cost tends to be requested also in the lens for projection. Further, a wider angle of view, which makes projection from a shorter projection distance onto a large display screen in a small room possible, is requested. Further, it is desirable that the magnification of the lens for projection is changeable so that the size of an image projected on the screen is changeable.

It is necessary to simplify the lens structure of a lens for projection to reduce the size and weight of the lens for projection. As variable magnification optical systems for projection with simple group structure consisting of a small number of lenses, optical systems disclosed in Japanese Unexamined Patent Publication No. 2008-107798 (Patent Document 1) and Japanese Unexamined Patent Publication No. 2010-113150 (Patent Document 2) are known. Patent Documents 1 and 2. disclose zoom lenses, in which an entire system consists of five lenses, and a first lens group having negative refractive power and a second lens group having positive refractive power are arranged in this order from a magnification side. These two lens groups move in the direction of an optical axis during magnification change.

SUMMARY OF THE INVENTION

The size of the zoom lenses disclosed in Patent Documents 1 and 2 is relatively small, and the number of lenses constituting the zoom lens is five, which is a small number of lenses. However, both of them have full angles of view of less than or equal to 55 degrees at a wide angle end, which are narrow. In recent years, a request for a low-priced and small-sized variable magnification optical system for projection with a fill angle of about 60 degrees at a wide angle end increased. However, if the angle of view is increased while this structure is maintained, correction of various aberrations, especially, correction of distortion, astigmatism and curvature of field becomes difficult Therefore, it is impossible to maintain excellent projection performance.

In view of the foregoing circumstances, it is an object of the present invention to provide a low-priced and small-sized variable magnification optical system for projection in which a wide angle of view is secured and various aberrations are excellently corrected while the optical system has a simple group structure consisting of a small number of lenses, and also a projection-type display apparatus including such a variable magnification optical system for projection.

A variable magnification optical system for projection of the present invention consists of a negative lens group having negative refractive power and a positive lens group having positive refractive power in this order from a magnification side. A distance on an optical axis between the negative lens group and the positive lens group changes during magnification change, and an entire system substantially consists of six lenses. The negative lens group consists of a first lens including an aspheric surface and a second lens that is a single lens having negative refractive power in this order from the magnification side.

In the variable magnification optical system for projection of the present invention, it is desirable that the first lens is made of plastic material, and that the following conditional expression (1) is satisfied, and it is more desirable that the following conditional expression (1') is satisfied:

$$|fw/f1|<0.1 \tag{1); and}$$

$$|fw/f1|<0.03 \tag{1''), where}$$

fw: a focal length of the entire system at a wide angle end, and
f1: a focal length of the first lens.

In the variable magnification optical system for projection of the present invention, it is desirable that the following conditional expression (2) is satisfied, and it is more desirable that the following conditional expression (2') is satisfied:

$$-0.8<fw/f2<-0.25 \tag{2); and}$$

$$-0.5<fw/f2<-0.30 \tag{2'), where}$$

fw: a focal length of the entire system at a wide angle end, and
f2: a focal length of the second lens.

In the variable magnification optical system for projection of the present invention, it is desirable that the following conditional expression (3) is satisfied, and it is more desirable that the following conditional expression (3') is satisfied:

$$0.7<R2r/fw<4.0 \quad (3); \text{ and}$$

$$1.0<R2r/fw<3.0 \quad (3'), \text{ where}$$

R2r: a curvature radius of a reduction-side surface of the second lens, and fw: a focal length of the entire system at a wide angle end.

In the variable magnification optical system for projection of the present invention, the second lens may be a biconcave lens.

In the variable magnification optical system for projection of the present invention, the positive lens group may consist of a positive lens, a positive lens, a negative lens and a positive lens in this order from the magnification side. Further, the optical system may be structured in such a manner that magnification is changed by moving the negative lens group and the positive lens group in the direction of an optical axis.

Alternatively, in the variable magnification optical system for projection of the present invention, the positive lens group may consist of a front group having positive refractive power and a rear group having positive refractive power in this order from the magnification side. Further, the front group may consist of a single lens having positive refractive power, and the rear group may consist of a positive lens, a negative lens and a positive lens in this order from the magnification side. Further, the optical system may be structured in such a manner that magnification is changed by moving each of the negative lens group, the front group and the rear group in the direction of an optical axis.

In the variable magnification optical system for projection of the present invention, it is desirable that both surfaces of all of the lenses in the entire system except the first lens are spherical surfaces.

In the variable magnification optical system for projection of the present invention, it is desirable that the following conditional expression (4) is satisfied, and it is more desirable that the following conditional expression (4') is satisfied:

$$FNw<3.0 \quad (4); \text{ and}$$

$$FNw<2.6 \quad (4'), \text{ where}$$

FNw: an F-number at a wide angle end.

A projection-type display apparatus according to the present invention includes a light source, a light valve on which light from the light source is incident, and the aforementioned variable magnification optical system for projection of the present invention, as a variable magnification optical system for projection that projects an optical image of light that has been optically modulated by the light valve onto a screen.

Here, the term "magnification side" means a projected side (a screen side). The screen side will be referred to as the magnification side also in reduction projection for the sake of convenience. On the other hand, the term "reduction side" means an original image display area side (a light valve side). The light valve side will be referred to as the reduction side also in reduction projection for the sake of convenience.

Here, the expression "substantially consists of six lenses" means that lenses substantially without any refractive power, optical elements other than the lenses, such as a stop and a cover glass, and the like may be included in addition to the six lenses.

The term "single lens" means a lens consisting of one lens that is not a cemented lens.

The surface shape of the lens, the sign of the refractive power of the lens and a curvature radius are considered in a paraxial region when the lens includes an aspheric surface.

The sign of a curvature radius is positive when a surface shape is convex toward the magnification side, and negative when a surface shape is convex toward the reduction side.

In the variable magnification optical system for projection according to the present invention, an entire system consists of six lenses. Therefore, the optical system is staid-rut-able at low price and in small size. Further, the variable magnification optical system for projection according to the present invention adopts a retro-focus type in which a negative lens group and a positive lens group are arranged in this order from the magnification side. Further, the structure of the negative lens group is set in an appropriate manner, and especially, an aspheric lens is arranged closest to the magnification side. Therefore, it is possible to secure a wide angle of view and to excellently correct various aberrations while the optical system his a simple group structure consisting of a small number of lenses.

Further, the projection-type display apparatus according to the present invention includes the variable magnification optical system for projection of the present invention. Therefore, the apparatus is structurable at low price and in small size, and a wide angle and excellent projection performance are achievable.

DESCRIPTION OF THE PREFERRED EMBODIMENTS

Figure 1:
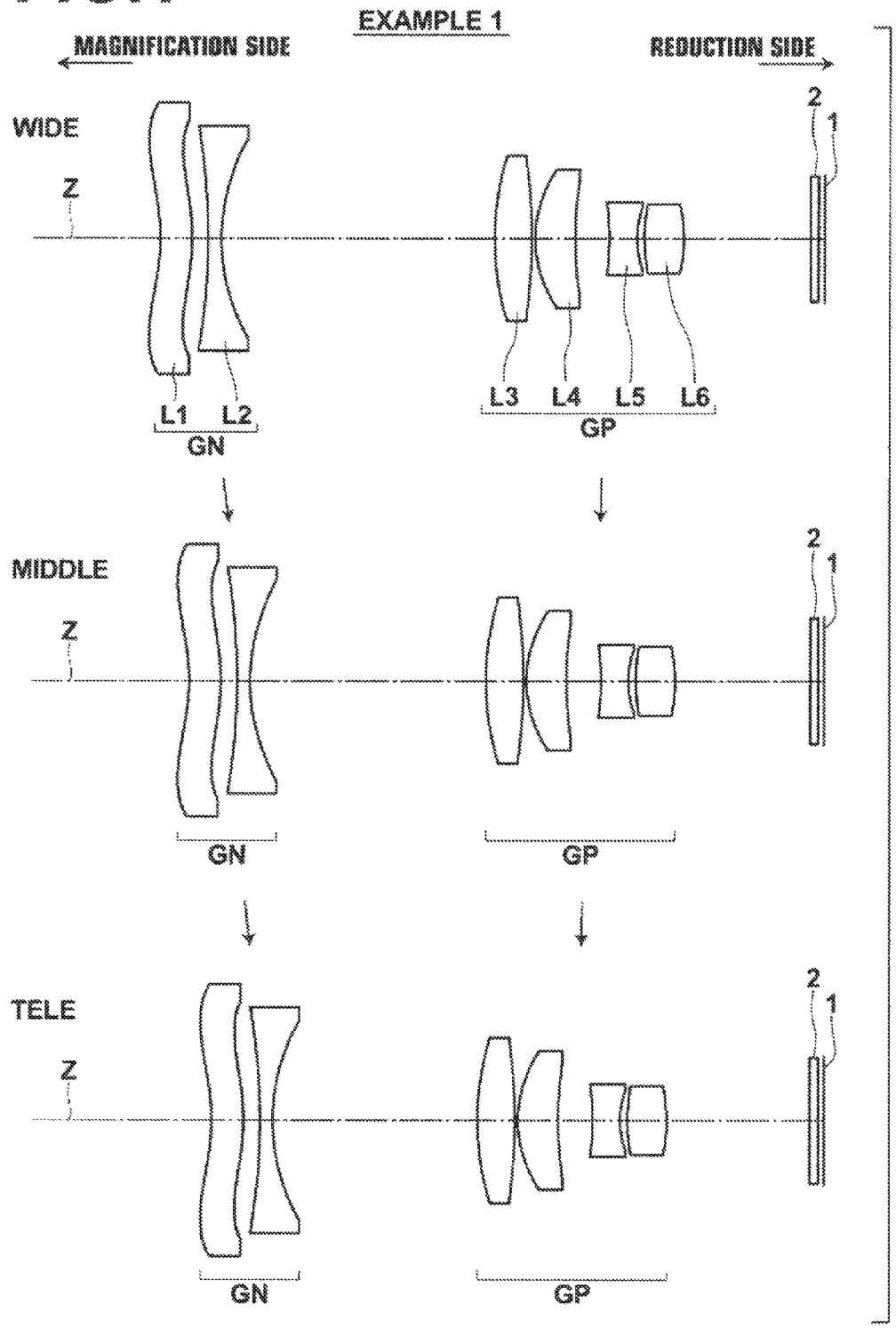
FIG. 1 is a cross section illustrating the lens structure of it variable magnification optical system for projection in Example 1 of the present invention.
Figure 2:
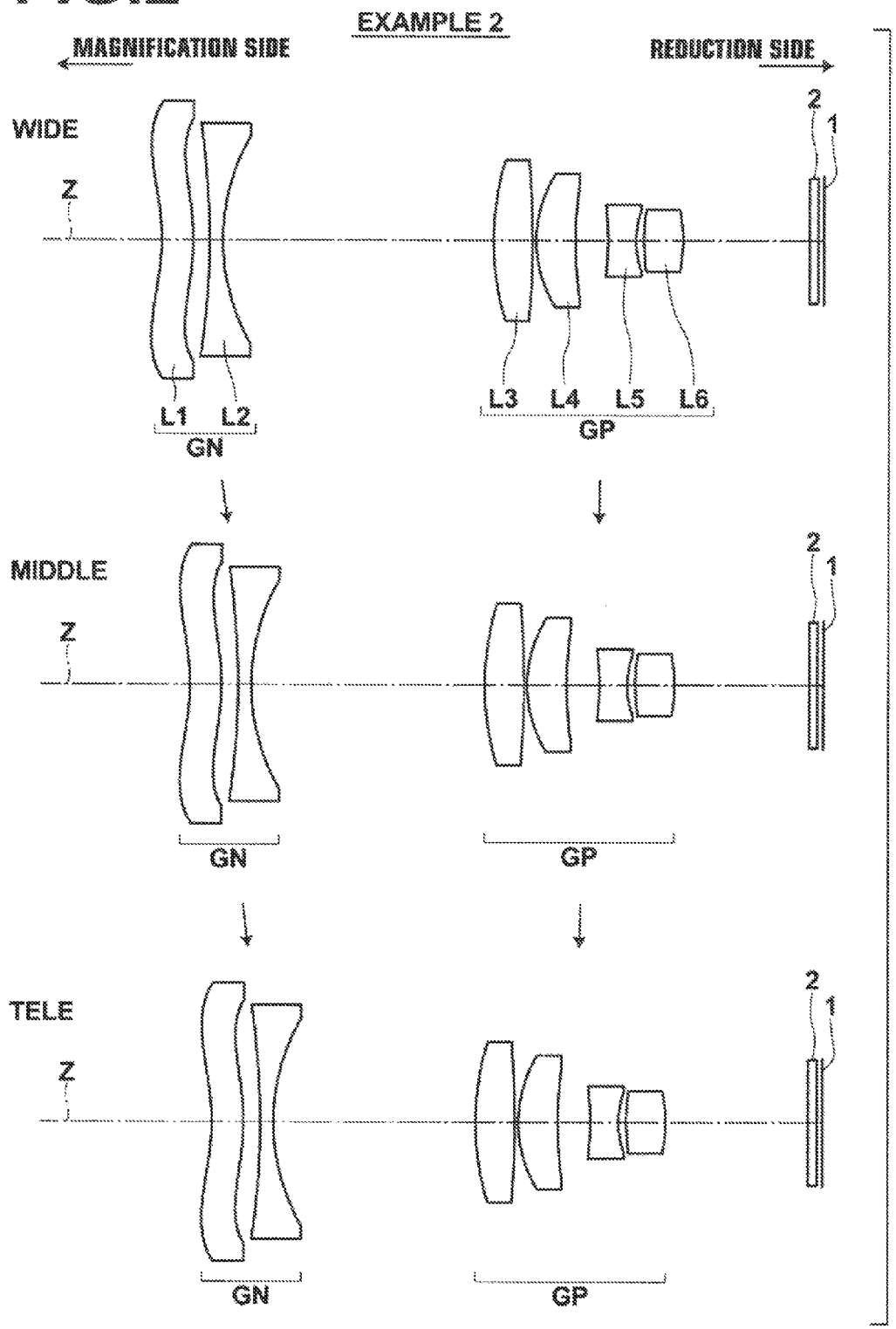
FIG. 2 is a cross section illustrating the lens structure of a variable magnification optical system for projection in Example 2 of the present invention.
Figure 3:
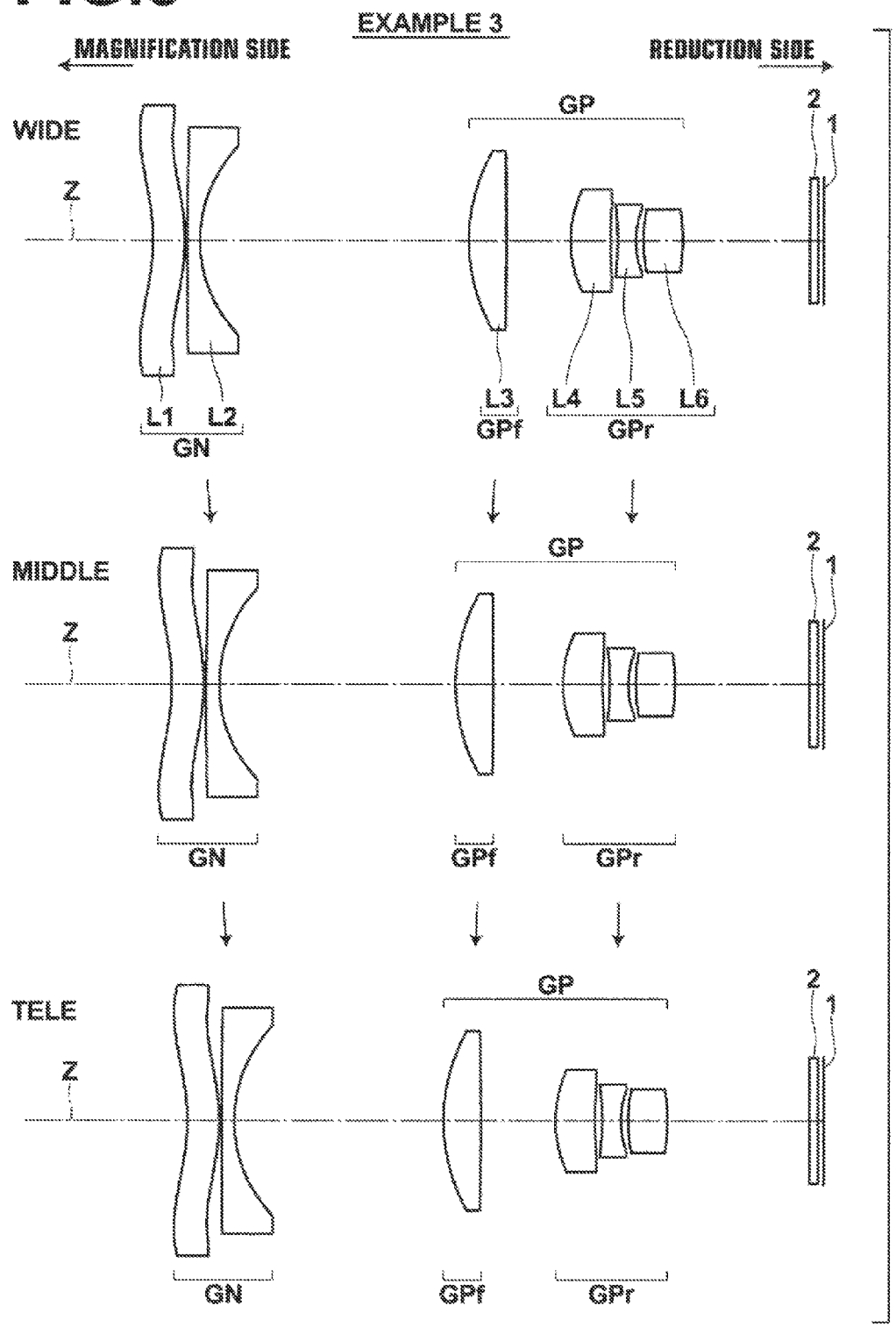
FIG. 3 is a cross section illustrating the lens structure of a variable magnification optical system for projection in Example 3 of the present invention.

Hereinafter, embodiments of the present invention will be described in detail with reference to drawings. FIG. 1 through FIG. 3 are cross sections illustrating examples of the structure of variable magnification optical systems for projection according to embodiments of the present invention. FIG. 1 through FIG. 3 correspond to variable magnification optical systems for projection in Examples 1 through 3, respectively, which will be described later. The basic structure of the examples illustrated in FIG. 1 through FIG. 3 is similar to each other, and an illustration method of FIG. 1 through FIG. 3 is also similar. Therefore, the variable magnification optical system for projection according to the embodiments of the present invention will be described mainly with reference to FIG. 1.

In FIG. 1, a diagram in the top row with the sign of "WIDE" illustrates the arrangement and composition of each lens group at a wide angle end. A diagram in the middle row with the sign of "MIDDLE" illustrates the arrangement and composition of each lens group in a middle focal length state, and a diagram in the bottom row with the sign of "TELE" illustrates the arrangement and composition of each lens group at a telephoto end.

This variable magnification optical system for projection may be mounted, for example, on a projection-type display apparatus, and usable as a lens for projection that projects image information displayed on a light valve onto a screen. In FIG. 1, the left side of the diagrams is a magnification side, and the right side of the diagrams is a reduction side. A case in which the optical system is mounted on a projection-type display apparatus is assumed, and a parallel-flat-plate-shaped optical member 2, which is assumed to be various filters, a cover glass or the like, and an image display surface 1 of the light valve are also illustrated.

In the projection-type display apparatus, rays to which image information has been given at the image display surface 1 enter this variable magnification optical system for projection through the optical member 2. The rays are projected onto a screen (not illustrated) arranged on the left side of the sheet surface by this variable magnification optical system for projection.

FIG. 1 illustrates only one image display surface 1 to simplify the drawing. The projection-type display apparatus may be structured so that a full color image is displayable by separating rays from a light source into three primary colors by a color separation optical system, and by providing three light valves for the respective primary colors.

The variable magnification optical system for projection according to the embodiment of the present invention consists of negative lens group GN having negative refractive power and positive lens group GP having positive refractive power arranged in this order from the magnification side. Since negative lens group GN is arranged on the screen side, the optical system is a retrofocus-type lens system, which is appropriate to achieve a wide angle of view.

The optical system is structured in such a manner that a distance on an optical axis between negative lens group GN and positive lens group GP changes during magnification change. For example, in the example illustrated in FIG. 1, when magnification is changed from a wide angle end to a telephoto end, negative lens group GN moves toward the reduction side, and positive lens group GP moves toward the magnification side. In FIG. 1, arrows between the top row and the middle row and arrows between the middle row and the bottom row schematically illustrate the direction of movement of each lens group when magnification is changed.

The variable magnification optical system for projection of the present invention substantially consists of six lenses of first lens L1 through sixth lens L6 in this order from the magnification side. The number of lenses in the entire system is six, which is a small number of lenses. Therefore, the optical system is structurable in small size and with simple structure, and producible at low cost. Further, when all of the lenses are single lenses, as in the example illustrated in FIG. 1, the structure is more advantageous in cost.

First lens L1 and second lens L2 constitute negative lens group GN, and third lens L3 through sixth lens L6 constitute positive lens group GP. The optical system is structured in such a manner that at least one of the surfaces of first lens L1 is an aspheric surface, and that second lens L2 is a single lens having negative refractive power.

Since an aspheric lens is arranged closest to the magnification side in the entire system, it is possible to efficiently correct distortion, astigmatism and curvature of field, which will become problems in attaining a wide angle of view. It is possible to realize a variable magnification optical system for projection with excellent performance while structuring the optical system with six lenses, which are a small number of lenses. When one of the surfaces of first lens L1 is an aspheric surface, it is possible to excellently correct aberrations. When both of the surfaces of first lens L1 are aspheric surfaces, more excellent, correction of aberrations is possible.

When second lens L2 is a negative lens, it is possible to secure negative refractive power required for negative lens group GN. Further, when second lens L2, the diameter of which tends to become large, is a single lens, it is possible to suppress the cost.

It is desirable that plastic is used as the material of first lens L1, which is an aspheric lens. When first lens L1 is a plastic lens, it is possible to suppress the cost.

When first lens L1 is a plastic lens, it is desirable that the following conditional expression (1) is satisfied:

$$|fw/f1|<0.1 \qquad (1),\text{ where}$$

fw: a focal length of the entire system at a wide angle end, and f1: a focal length of the first lens.

When conditional expression (1) is satisfied, it is possible to weaken the refractive power of first lens L1. Even if first lens L1 is a plastic lens, it is possible to suppress a shift in the focal position during temperature change, and to maintain excellent performance.

Therefore, when first lens L1 is a plastic lens, it is more desirable that the following conditional expression (1') is satisfied to suppress a shift in the focal position. due to change in temperature even more:

$$|fw/f1|<0.03 \quad (1').$$

Further, regarding second lens L2, it is desirable that the variable magnification optical system for projection according to the embodiment of the present invention satisfies the following conditional expression (2):

$$-0.8<fw/f2<-0.25 \quad (2), \text{ where}$$

fw: a focal length of the entire system at a wide angle end, and f2: a focal length of the second lens.

If the value is less than or equal to the lower limit of conditional expression (2), the refractive power of second lens L2 becomes too strong, and a coma aberration and astigmatism become large. If the value is higher than or equal to the upper limit of conditional expression (2), the refractive power of second lens L2 becomes weak, and the Petzval sum of the entire lens system increases. Therefore, it becomes difficult to excellently correct curvature of field.

Therefore, it is more desirable that the following conditional expression (2') is satisfied to more excellently correct a coma aberration, astigmatism and curvature of field:

$$-0.5<fw/f2<-0.30 \quad (2').$$

Further, it is desirable that the variable magnification optical system for projection according to the embodiment of the present invention satisfies the following conditional expression (3):

$$0.7<R2r/fw<4.0 \quad (3), \text{ where}$$

R2r: a curvature radius of a reduction-side surface of the second lens, and fw: a focal length of the entire system at a wide angle end.

In the variable magnification optical system for projection according to the embodiment of the present invention lens L2 tends to greatly contribute to the negative refractive power of negative lens group GN. In that case, the reduction-side surface of second lens L2 is a concave surface, and refractive power given to this surface is important. If the value is lower than or equal to the lower limit of conditional expression (3), especially a coma aberration becomes large. If the value is higher than or equal to the higher limit of conditional expression (3), especially astigmatism becomes large.

Therefore, it is more desirable that the following conditional expression (3') is satisfied to more excellently correct a coma aberration and astigmatism:

$$1.0<R2rf/fw<3.0 \quad (3').$$

Further, it is desirable that the variable magnification optical system for projection according to the embodiment of the present invention satisfies the following conditional expression (4):

$$FNw<3.0 \quad (4), \text{ where}$$

FNw: an F-number at a wide angle end.

If the value is higher than or equal to the upper limit of conditional expression (4), it becomes difficult to secure appropriate brightness for the projection-type display apparatus using the DMD display device.

Therefore, it is more desirable that the following conditional expression (4') is satisfied to more easily secure appropriate brightness for the projection-type display apparatus using the DMD display device:

$$FNw<2.6 \quad (4').$$

In the variable magnification optical system for projection of the present invention, second lens L2 may be a biconcave lens, or a negative meniscus lens with its convex surface facing the magnification side. When second lens L2 is a biconcave lens, even if a simple structure in which the number of lens groups that move during magnification change is two is adopted, it is possible to excellently correct aberrations, especially a spherical aberration and a coma aberration, for the entire variable magnification range from a wide angle end through a telephoto end.

For example, in the examples illustrated in FIG. 1 and FIG. 2, the optical system is structured in such a manner that magnification is changed by moving each of two lens groups of negative lens group GN and positive lens group GP in the direction of an optical axis during magnification change. When magnification is changed in such a two-group structure, it is desirable that positive lens group GP consists of a positive lens, a positive lens, a negative lens and a positive lens in this order from the magnification side. When such a structure is adopted, it is possible to provide a simple and compact variable magnification optical system.

More specifically, in the examples illustrated in FIG. 1 and FIG. 2, the optical system consists of first lens L1 having negative meniscus shape with its convex surface facing the reduction side in a paraxial region, second lens L2, which is a biconcave lens, third lens L3, which is a biconvex lens, fourth lens L4, which is a positive meniscus lens with its convex surface facing the magnification side, fifth lens L5, while is a biconcave lens, and sixth lens L6, which is a biconvex lens.

Alternatively, as in the example illustrated in FIG. 3, in the variable magnification optical system for projection of the present invention, positive lens group GP may consist of front group GPf having positive refractive power and rear group GPr having positive refractive power in this order from the magnification side. Further, the optical system may be structured in such a manner that magnification is changed by moving each of three lens groups of negative lens group GN, front group GPf and rear group GPr in the direction of an optical axis during magnification change. When magnification is changed in such a three-group structure, it is desirable that front group GPf consists of a positive single lens, and that rear Group GPr consists of a positive lens, a negative lens and a positive lens in this order from the magnification side. When such a structure is adopted, it is possible to further suppress a fluctuation of aberrations during magnification change.

More specifically, in the example illustrated in FIG. 3, the optical system consists of first lens L1 having positive meniscus shape with its convex surface facing the reduction side in a paraxial region, second lens L2, which is a negative meniscus lens with its convex surface facing the magnification side, third lens L3, which is a biconvex lens, fourth lens L4, which is a positive meniscus lens with its convex surface facing the magnification side, fifth lens L5, which is a biconcave lens, and sixth lens L6, which is a biconvex lens.

In the variable magnification optical system for projection of the present invention, it is desirable that all of the lenses in the entire system except first lens L1 are spherical lenses. When all of second lens L2 through sixth lens L6 are spherical lenses, it is possible to suppress the cost of production.

Further, the variable magnification optical system for projection of the present invention may be a zoom lens, or a varifocal lens. When the optical system is a varifocal lens, it is possible to simplify a lens driving mechanism, compared with the zoom lens. Therefore, it is possible to structure the optical system at lower price. When the optical system is a varifocal lens, the optical system may be structured, for example, in such a manner that a focal length is changed by moving positive lens group GP and that focusing is performed by moving negative lens group GN.

Further, it is desirable that distortion is suppressed to abot 2% or less in the entire variable magnification range of the variable magnification optical system for projection, which is an object of the present invention.

It is desirable that the aforementioned desirable structure and adoptable structure is selectively adopted in an appropriate manner based on what is requested in the variable magnification optical system for projection.

Figure 16:
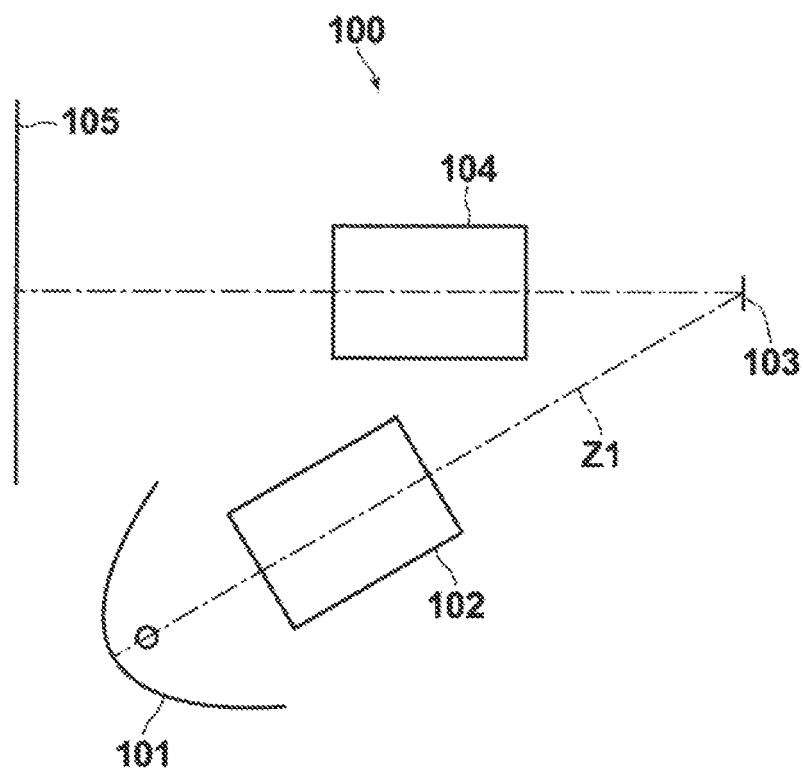
FIG. 16 is a schematic diagram illustrating the structure of a projection-type display apparatus according to an embodiment of the present invention.

Next, embodiments of the projection-type display apparatus of the present invention will be described with reference to FIG. 16. FIG. 16 is a schematic diagram illustrating the structure of a projection-type display apparatus 100 according to an embodiment of the present invention. This projection-type display apparatus 100 includes a light source 101, an illumination optical system 102, a DMD 103, as a light valve, and a variable magnification optical system 104 for projection according to an embodiment of the present invention.

Rays output from the light source 101 are selectively converted into light of each of three primary colors (R, G and B) in time series by a color wheel, which is not illustrated. Further, the distribution of the light amount of light in a cross section perpendicular to optical axis Z1 is made uniform by the illumination optical system 102, and the light illuminates the DMD 103. The DMD 103 switches modulation based on the switched color of incident light to modulate light of the color. The light modulated by the DMD 103 enters the variable magnification optical system 104 for projection. The variable magnification optical system 104 for projection projects an optical image of the light modulated by the DMD 103 onto a screen 105.

The projection-type display apparatus of the present invention may be modified in various manners from what is illustrated in FIG. 16. For example, modulation may be performed for each color of RGB at the same time by providing three DMD's corresponding to light of respective colors, instead of providing a single-panel DMD. In this case, a color separation combination prism, which is not illustrated, is provided between the variable magnification optical system 104 for projection and the DMD's 103.

Further, a different light valve may be used instead of the DMD 103. For example, a transmission-type liquid crystal display device or a reflection-type liquid crystal display device may be used as the light valve.

Next, specific examples of the variable magnification optical system for projection of the present invention will be described.

EXAMPLE 1

FIG. 1 is a diagram illustrating the lens structure of a variable magnification optical system for projection in Example 1. Since FIG. 1 has been described already, repetition of explanation will be omitted.

The variable magnification optical system for projection in Example 1 is a zoom lens consisting of two lens groups of negative lens group GN having negative refractive power and positive lens group GP having positive refractive power in this order from the magnification side. Negative lens group GN moves toward the reduction side, and positive lens group GP moves toward the magnification side during magnification change.

Negative lens group GN consists of first lens L1 having negative meniscus shape with its convex surface facing the reduction side in a paraxial region and second lens L2, which is a biconcave lens, in this order from the magnification side. Further, positive lens group GP consists of third lens L3, which is a biconvex lens, fourth lens L4. Which is a positive meniscus lens with its convex surface facing the magnification side, fifth lens L5, which is a biconcave lens, and sixth lens L6, which is a biconvex lens, in this order from the magnification side. Further, all of the lenses are single lenses, and both surfaces of first lens L1 are aspheric surfaces.

Table 1 shows basic lens data on the variable magnification optical system lens for projection in Example 1. In the basic lens data, column Si shows the surface number of the i-th surface (i=1, 2, 3, . . . ) when the magnification-side surface of the most magnification-side composition element is the first surface, and surface numbers are assigned to surfaces of composition elements to sequentially increase toward the reduction side. Column Ri shows the curvature radius of the i-th surface, and column Di shows a distance between the i-th surface and the (i+1)th surface on optical axis Z. Column Ndj shows the refractive index of the j-th composition element (=1, 2, 3, . . . ) for d-line (wavelength is 587.6 nm). The most magnification-side composition element is the first composition element, and the number of j sequentially increases toward the reduction side. The column vdj shows the Abbe number of the j-th composition element for d-line.

Here, the sign of a curvature radius is positive when a surface shape is convex toward the magnification side, and negative when a surface shape is convex, toward the reduction side. The basic lens data show data including the optical member 2. Further, mark * is attached to the surface numbers of aspheric surfaces. The column of curvature radius shows the numerical values of paraxial curvature radii for these aspheric surfaces.

A distance between negative lens group GN and positive lens group GP and a distance between positive lens group GP and the optical member 2 are variable surface distances that change during magnification change. In the column of surface distances, "DD" followed by the surface number of a magnification-side surface of a variable surface distance enclosed by brackets is written for the variable surface distance. For example, in Example 1, "DD[4]" and "DD[12]" are written for these variable surface distances, respectively, in the column of surface distances.

Table 2 shows specification and values of variable surface distances of the variable magnification optical system for projection in Example 1 at a wide angle end, in a middle focal length state, and at a telephoto end. Table 2 shows a variable magnification ratio, a focal length of an entire system, F-number FNo., full angle 2ω of view (the unit is degree), and backfocus Bf (length in air), as the specification. These are values for d-line. Table 2 shows values when a projection distance is as indicated above the frame of Table 2.

Table 3 shows aspherical surface coefficients of each of the aspheric surfaces. In the numerical values of the aspherical surface coefficients in Table 3, "E-n" (n: integer) means "×10$^{-n}$". The aspherical surface coefficients are values of coefficients K, $A_m$ (m=3, 4, 5, . . . 10) in an aspheric surface equation represented by the following expression:

$$Zd = \frac{C \cdot Y^2}{1 + \sqrt{1 - K \cdot C^2 \cdot Y^2}} + \sum_{m=3}^{10} A_m Y^m, \qquad \text{[Number 1]}$$

where

Zd: the depth of an aspheric surface (the length of a perpendicular from a point on the aspheric surface at height Y to a plane that contacts with the vertex of the aspheric surface and is perpendicular to the optical axis), Y: a height (the length from the optical axis to the lens surface), C: a paraxial curvature, and K, $A_m$: aspherical surface coefficients (m=3, 4, 5, ... 10).

The numerical values shown in Table 1 through Table 3 are normalized values so that the focal length of the entire system at a wide angle end is 10. Further, numerical values in each of the tables are rounded at predetermined digits.

TABLE 1

EXAMPLE 1 BASIC LENS DATA

| Si | Ri | Di | Ndj | vdj |
|---|---|---|---|---|
| *1 | −17.534 | 2.729 | 1.49100 | 57.58 |
| *2 | −18.484 | 1.405 | | |
| 3 | −62.191 | 1.092 | 1.58913 | 61.14 |
| 4 | 18.471 | DD[4] | | |
| 5 | 25.493 | 3.224 | 1.62299 | 58.16 |
| 6 | −53.442 | 0.272 | | |
| 7 | 11.368 | 3.411 | 1.77250 | 49.60 |
| 8 | 33.466 | 2.971 | | |
| 9 | −26.923 | 2.388 | 1.80518 | 25.42 |
| 10 | 8.248 | 0.645 | | |
| 11 | 16.358 | 3.412 | 1.77250 | 49.60 |
| 12 | −13.212 | DD[12] | | |
| 13 | ∞ | 0.716 | 1.51633 | 64.14 |
| 14 | ∞ | | | |

TABLE 2

EXAMPLE 1 SPECIFICATION AND VARIABLE SURFACE DISTANCE (PROJECTION DISTANCE = 1350)

| | WIDE ANGLE END | MIDDLE | TELEPHOTO END |
|---|---|---|---|
| VARIABLE MAGNIFICATION RATIO | 1.0 | 1.1 | 1.2 |
| FOCAL LENGTH | 10.00 | 10.99 | 11.98 |
| FNo. | 2.40 | 2.54 | 2.68 |
| 2ω[°] | 59.8 | 55.0 | 50.8 |
| Bf | 11.818 | 12.499 | 13.179 |
| DD[4] | 23.571 | 20.340 | 17.647 |
| DD[12] | 10.917 | 11.613 | 12.310 |

TABLE 3

EXAMPLE 1 ASPHERICAL SURFACE COEFFICIENT

| SURFACE NUMBER | 1 | 2 |
|---|---|---|
| K | 0.000000E+00 | 0.000000E+00 |
| A3 | 0.000000E+00 | 0.000000E+00 |
| A4 | 3.105476E−04 | 3.606347E−04 |
| A5 | −1.068407E−05 | −3.472355E−05 |
| A6 | −9.625388E−07 | 4.084009E−06 |
| A7 | 1.768073E−07 | −2.783896E−07 |
| A8 | −1.405181E−08 | 3.052325E−09 |
| A9 | 5.664081E−10 | 3.735244E−10 |
| A10 | −4.305602E−12 | 9.564358E−12 |

Figure 4:
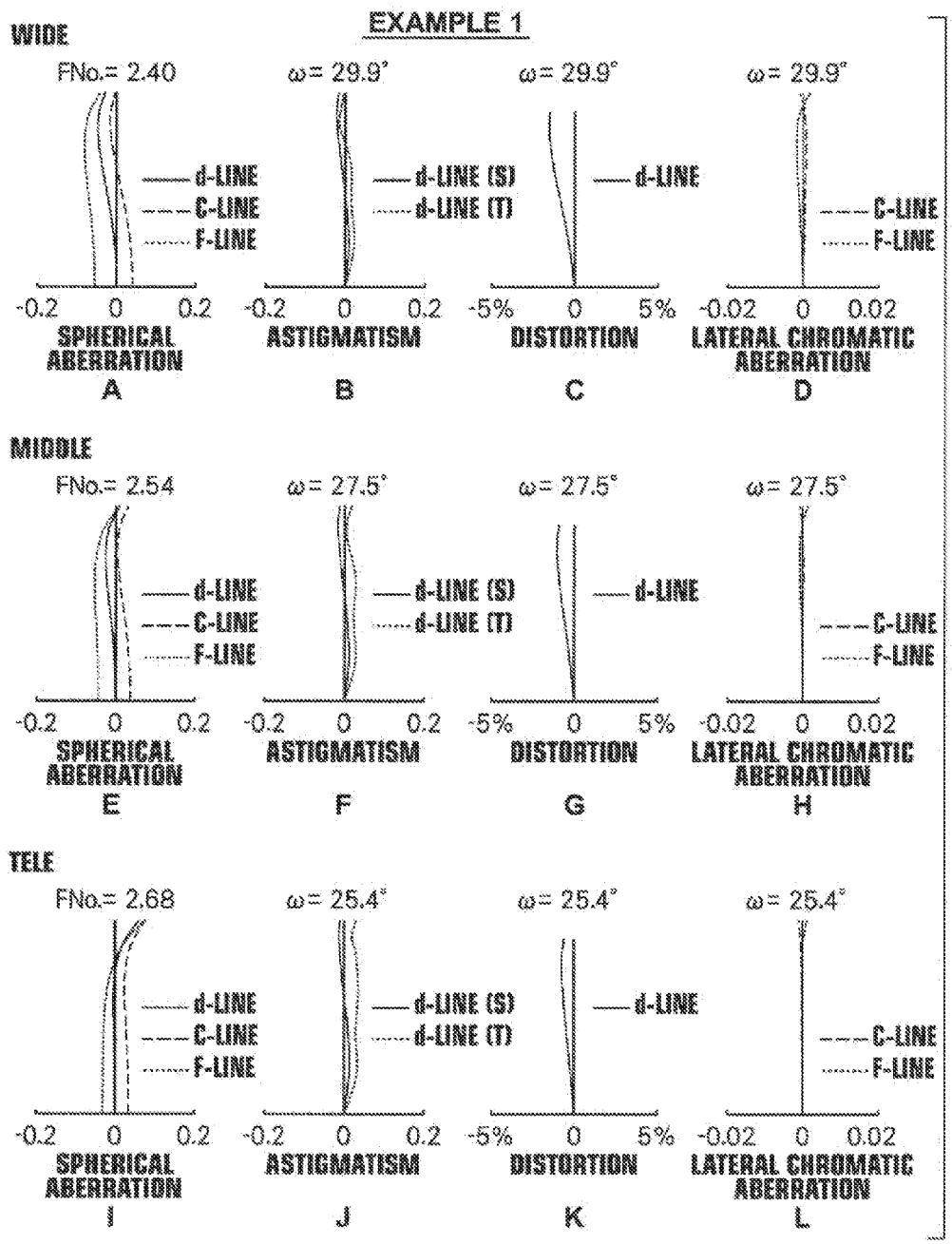
FIG. 4, Sections A through L are aberration diagrams of the variable magnification optical system for projection in Example 1 of the present invention.

FIG. 4, Sections A through D illustrate aberration diagrams of a spherical aberration, astigmatism, distortion, and a lateral chromatic aberration of the variable magnification optical system for projection in Example 1 at a wide angle end, respectively. FIG. 4, Sections E through H illustrate aberration diagrams of a spherical aberration, astigmatism, distortion, and a lateral chromatic aberration of the variable magnification optical system for projection in Example 1 in a middle focal length state, respectively. FIG. 4, Sections I through L illustrate aberration diagrams of a spherical aberration, astigmatism, distortion, and a lateral chromatic aberration of the variable magnification optical system for projection in Example 1 at a telephoto end, respectively.

Each of the aberration diagrams in FIG. 4, Sections A through L is based on d-line. The diagrams of the spherical aberration illustrate aberrations also for F-line (wavelength is 486.1 nm) and C-line (wavelength is 656.3 nm). The diagrams of the lateral chromatic aberration illustrate aberrations for F-line and C-line. In the diagrams of the astigmatism, aberrations for the sagittal direction are indicated by solid lines, and aberrations for the tangential direction are indicated by broken lines. In the diagrams of the spherical aberration, the sign "FNo." on the top of the vertical axis represents an F-number. In the other aberration diagrams, the sign "ω" on the top of the vertical axis represents a half angle of view. The aberration diagrams of FIG. 4 illustrate aberrations when a projection distance is the value indicated in the aforementioned table of specification and variable surface distances.

Figure 5:
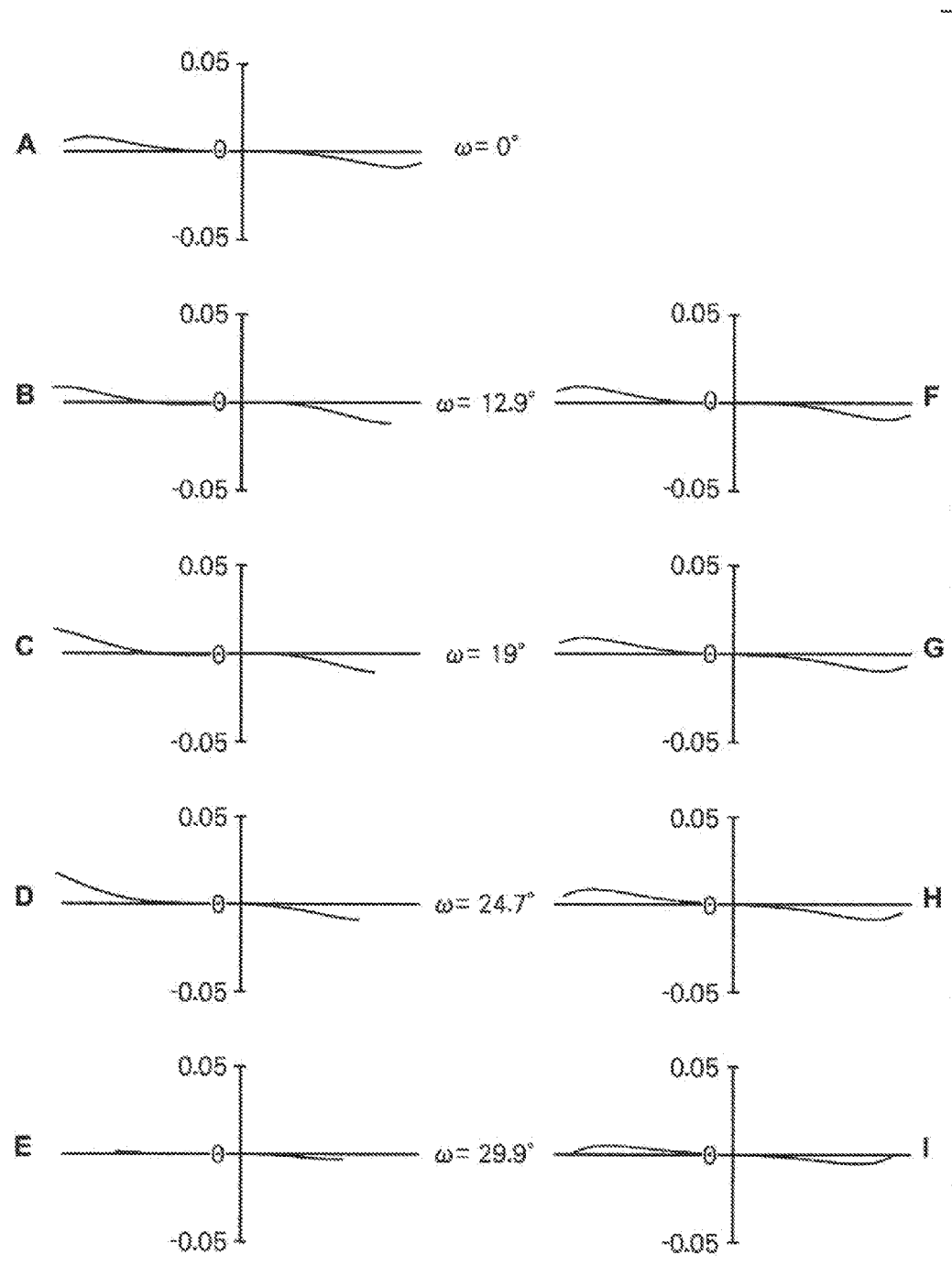
FIG. 5, Sections A through I are lateral aberration diagrams of the variable magnification optical system for projection in Example 1 of the present invention at a wide angle end.

FIG. 5, Sections A through E are lateral aberration diagrams of the variable magnification optical system for projection in Example 1 at a wide angle end, and illustrate aberrations in a tangential direction at each angle of view. FIG. 5, Sections F through I are lateral aberration diagrams of the variable magnification optical system for projection in Example 1 at a wide angle end, and illustrate aberrations in a sagittal direction at each angle of view. The lateral aberration diagrams in FIG. 5 illustrate aberrations for d-line. In FIG. 5, ω means a half angle of view, and a lateral aberration diagram in the tangential direction and a lateral aberration diagram in the sagittal direction for the same angle of view are arranged next to each other in a horizontal direction.

Figure 6:
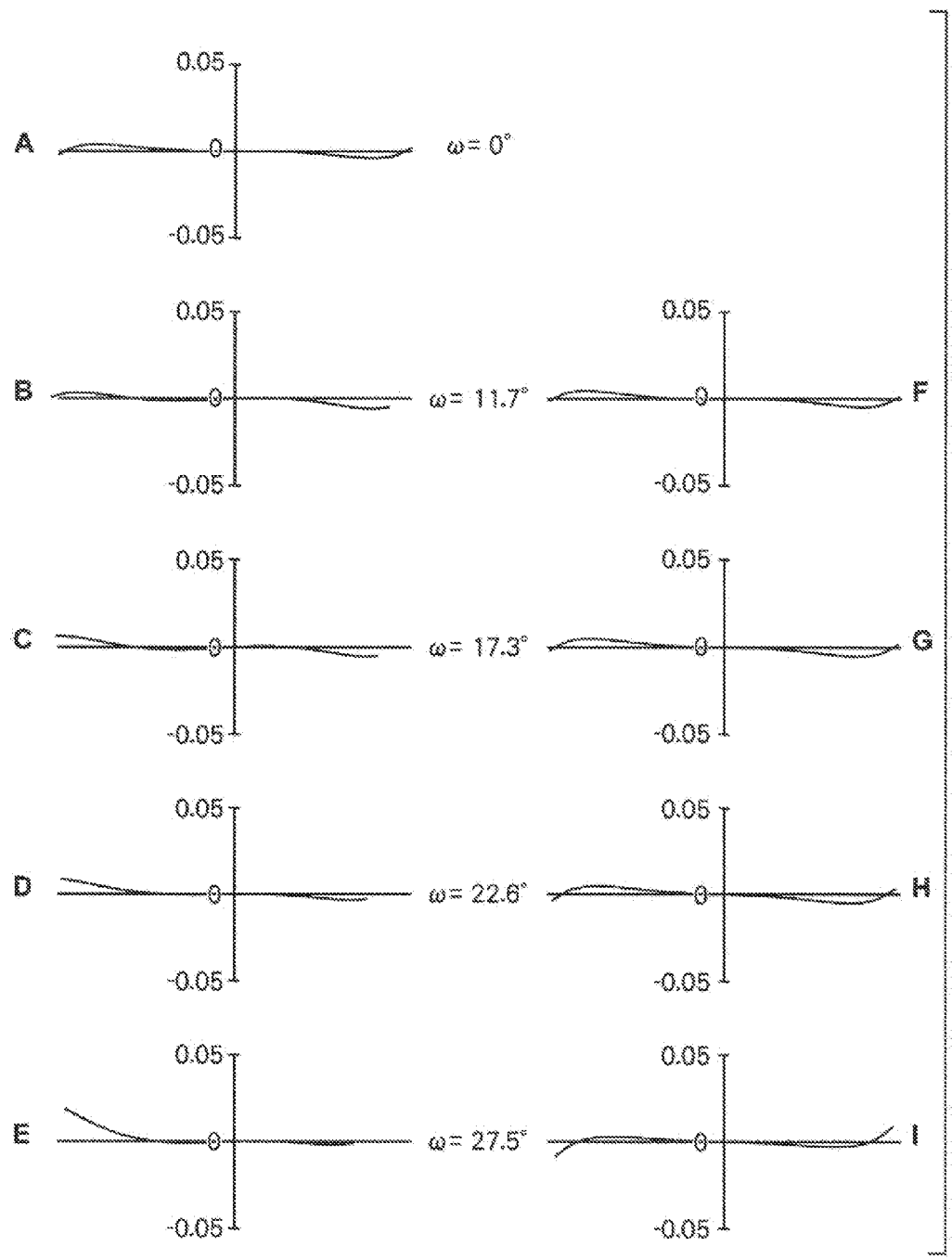
FIG. 6, Sections A through I are lateral aberration diagrams of the variable magnification optical system for projection in Example 1 of the present invention in a middle focal length state.
Figure 7:
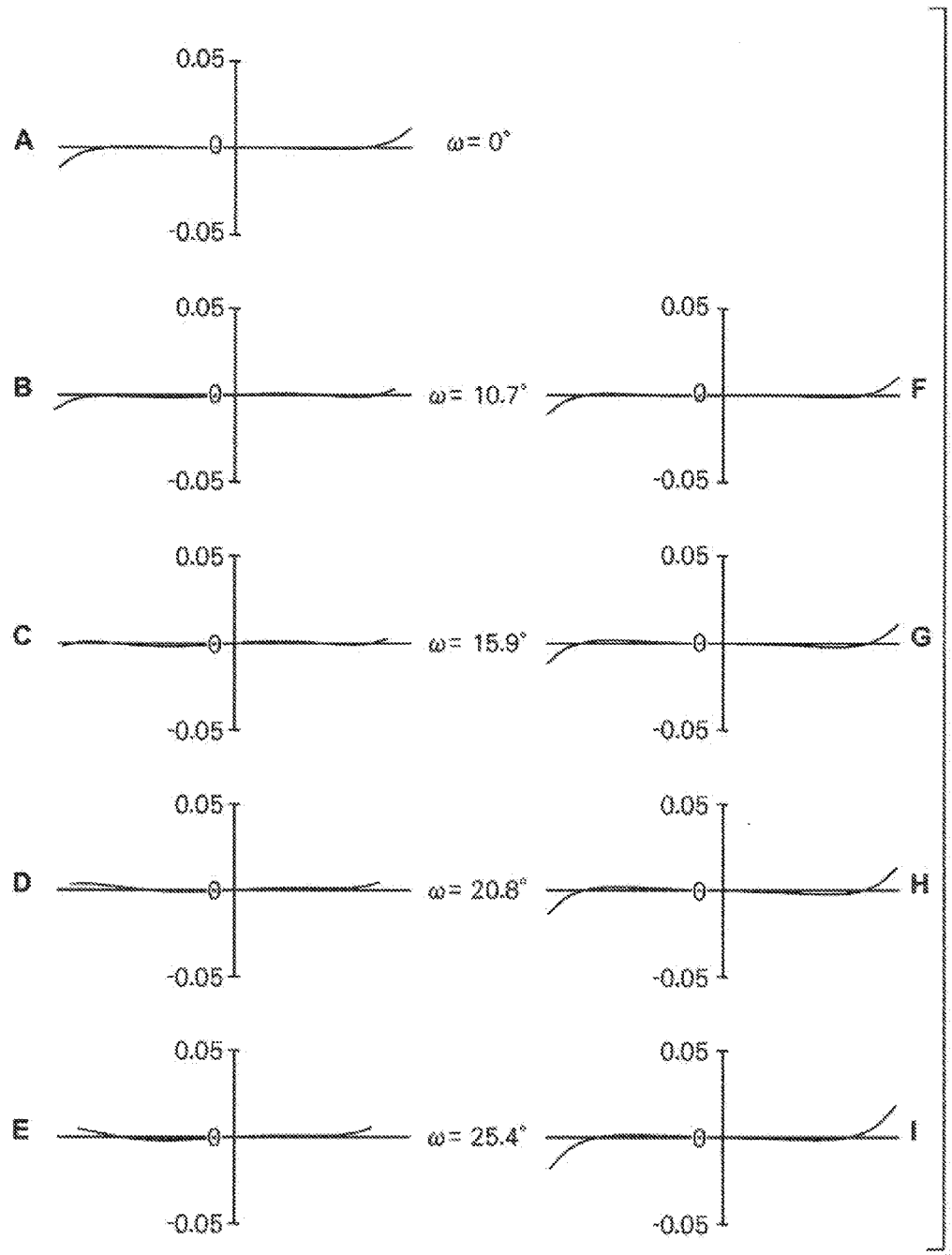
FIG. 7, Sections A through I are lateral aberration diagrams of the variable magnification optical system for projection in Example 1 of the present invention at a telephoto end.

Similarly, FIG. 6, Sections A through I are lateral aberration diagrams of the variable magnification optical system for projection in Example 1 in a middle focal length state. FIG. 7, Sections A through I are lateral aberration diagrams of the variable magnification optical system for projection in Example 1 at a telephoto end. The aberration diagrams of FIG. 5 through FIG. 7 illustrate aberrations when a projection distance is the value indicated in the aforementioned table of specification and variable surface distances.

The signs, meanings and description methods of various data, the feature that values are normalized in such a manner that the focal length of the entire system at a wide angle end is 10, and the feature that each of aberration diagrams shows values when a projection distance is the value indicated in the table of specification and variable surface distances, and the like, which have been described in the explanation of Example 1, are similar also in the following Examples 2 and 3 unless otherwise specifically mentioned.

EXAMPLE 2

FIG. 2 illustrates the lens structure of the variable magnification optical system for projection in Example 2. The variable magnification optical system for projection in Example 2 has substantially similar structure to the variable magnification optical system for projection in Example 1.

Figure 8:
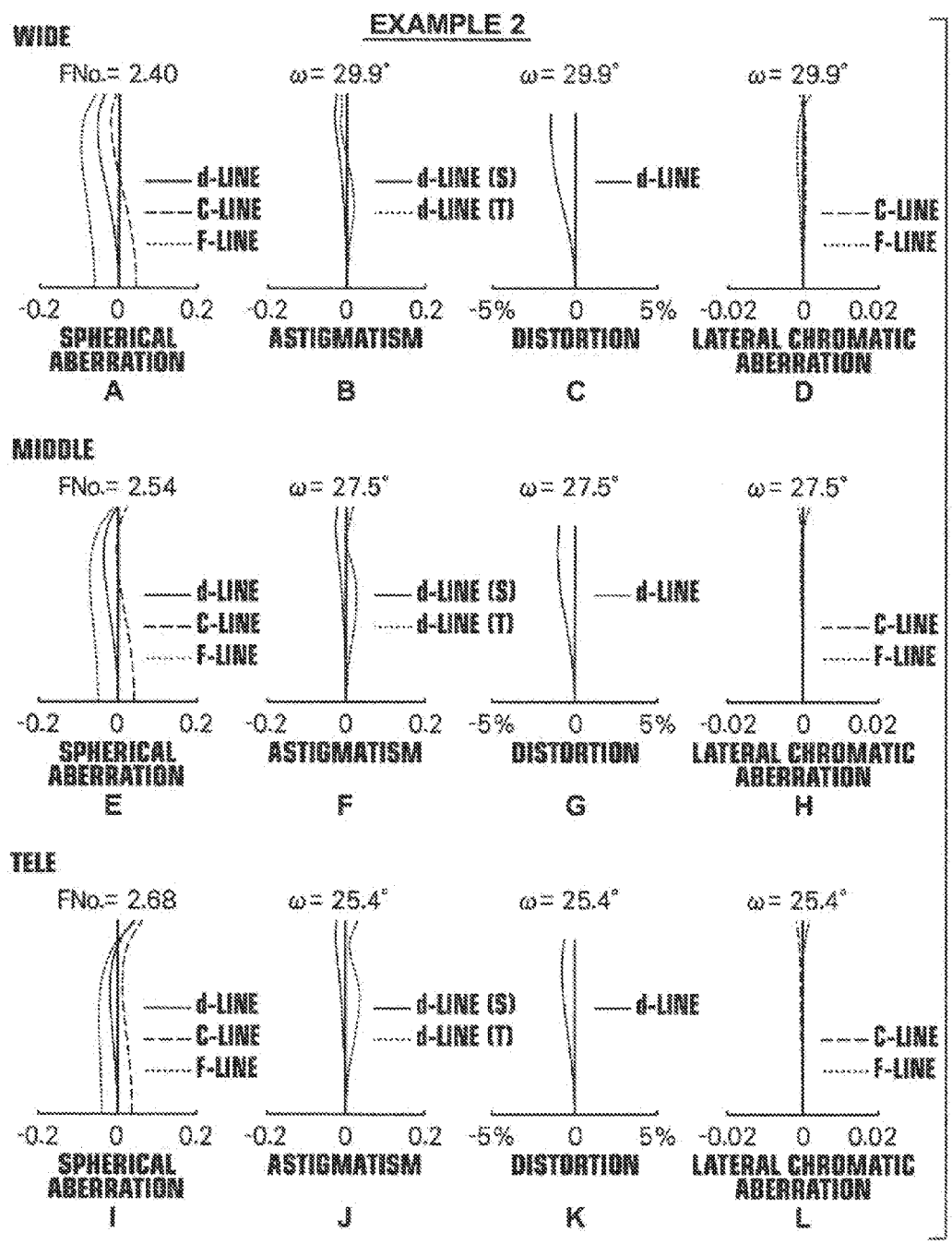
FIG. 8, Sections A through L are aberration diagrams of the variable magnification optical system for projection in Example 2 of the present invention.
Figure 9:
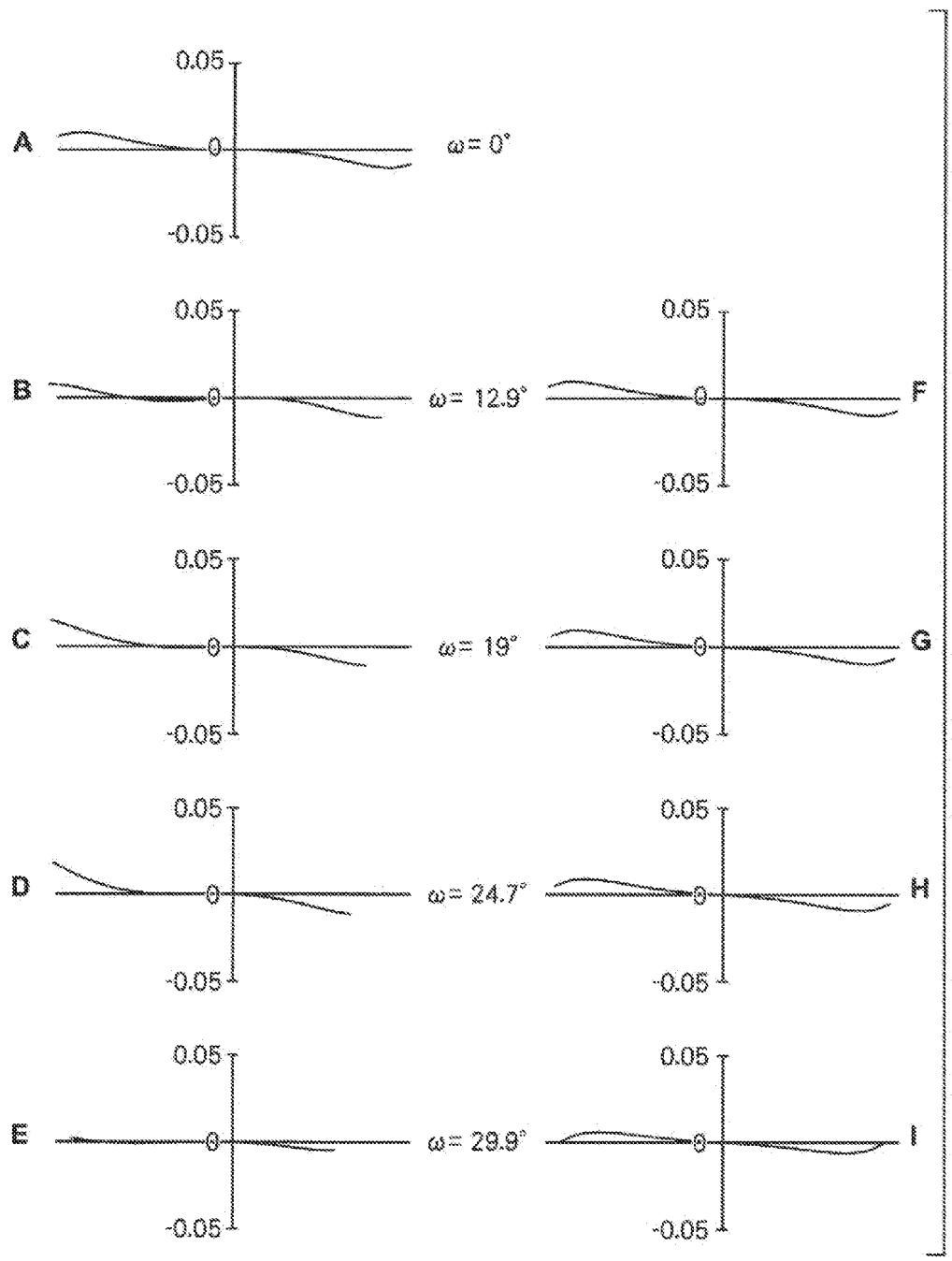
FIG. 9, Sections A through I are lateral aberration diagrams of the variable magnification optical system for projection in Example 2 of the present invention at a wide angle end.
Figure 10:
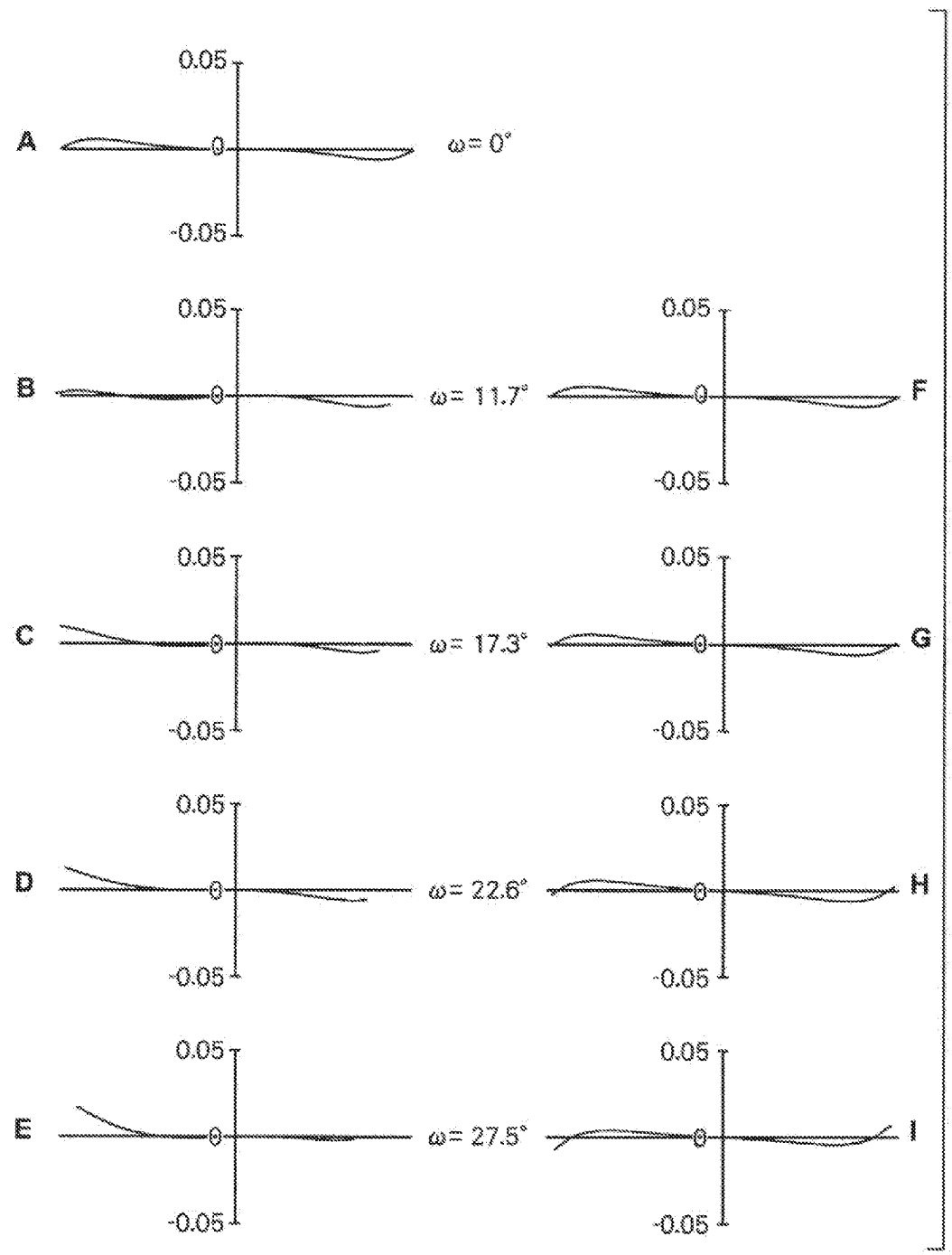
FIG. 10, Sections A through I are lateral aberration diagrams of the variable magnification optical system for projection in Example 2 of the present invention in a middle focal length state.
Figure 11:
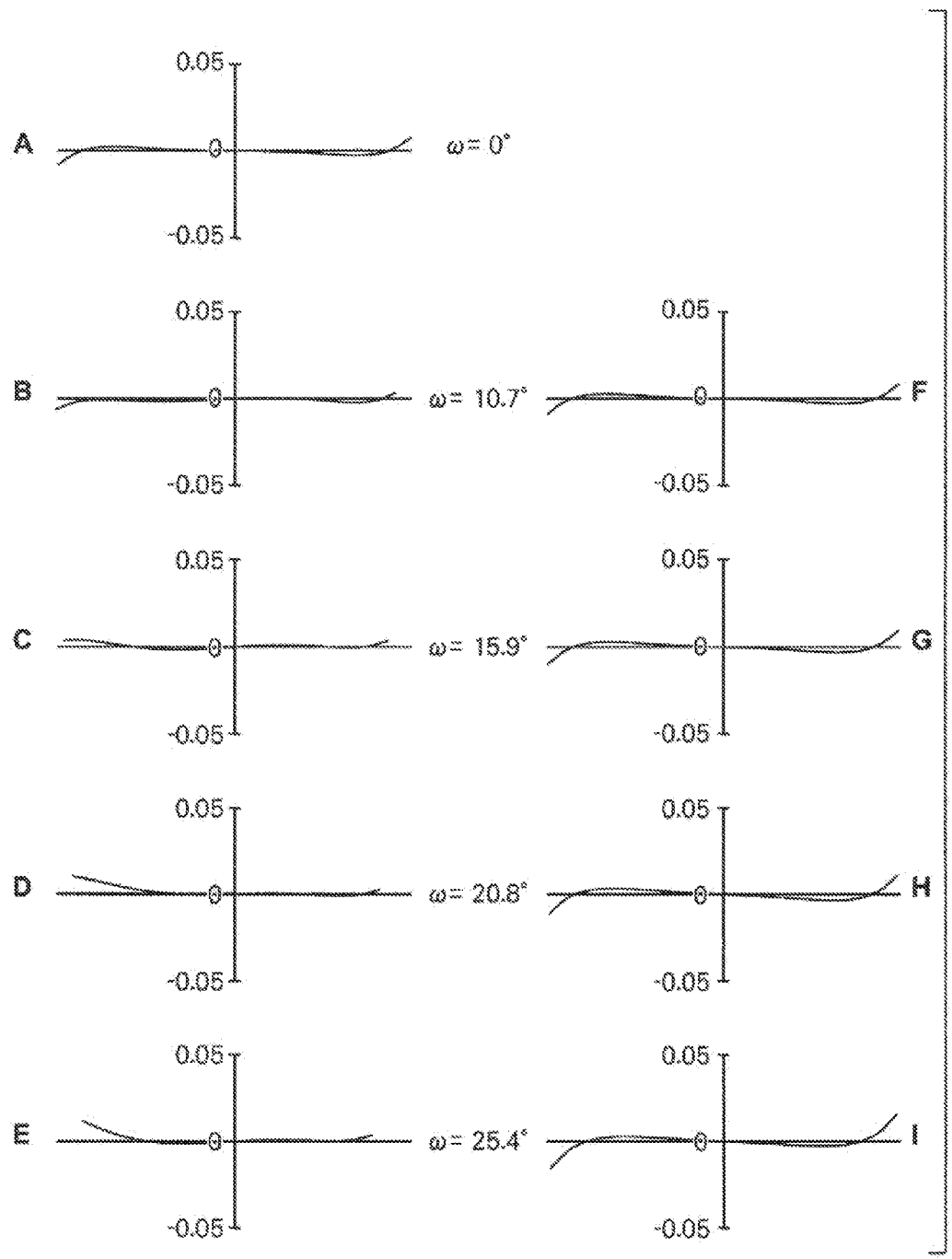
FIG. 11, Sections A through I are lateral aberration diagrams of the variable magnification optical system for projection in Example 2 of the present invention at a telephoto end.

Table 4, Table 5 and Table to show basic lens data on the variable magnification optical system for projection in Example 2, specification and variable surface distances, and aspherical surface coefficients, respectively. FIG. 8, Sections A through L, FIG. 9, Sections A through I, FIG. 10, Sections A through I and FIG. 11. Sections A through I illustrate aberration diagrams of the variable magnification optical system for projection in Example 2.

TABLE 4

EXAMPLE 2 BASIC LENS DATA

| Si | Ri | Di | Ndj | vdj |
|---|---|---|---|---|
| *1 | −19.244 | 2.729 | 1.49023 | 57.45 |
| *2 | −20.395 | 1.464 | | |
| 3 | −72.500 | 1.091 | 1.62041 | 60.29 |
| 4 | 19.092 | DD[4] | | |
| 5 | 25.204 | 3.411 | 1.71299 | 53.87 |
| 6 | −80.731 | 0.273 | | |
| 7 | 11.628 | 3.411 | 1.77250 | 49.60 |
| 8 | 36.068 | 2.803 | | |
| 9 | −26.332 | 2.387 | 1.80518 | 25.42 |
| 10 | 8.293 | 0.656 | | |
| 11 | 16.739 | 3.410 | 1.77250 | 49.60 |
| 12 | −12.876 | DD[12] | | |
| 13 | ∞ | 0.716 | 1.51633 | 64.14 |
| 14 | ∞ | | | |

TABLE 5

EXAMPLE 2 SPECIFICATION AND VARIABLE SURFACE DISTANCE (PROJECTION DISTANCE = 1350)

| | WIDE ANGLE END | MIDDLE | TELEPHOTO END |
|---|---|---|---|
| VARIABLE MAGNIFICATION RATIO | 1.0 | 1.1 | 1.2 |
| FOCAL LENGTH | 10.00 | 10.99 | 11.98 |
| FNo. | 2.40 | 2.54 | 2.68 |
| 2ω[°] | 59.8 | 55.0 | 50.8 |
| Bf | 11.817 | 12.489 | 13.161 |
| DD[4] | 23.330 | 20.097 | 17.403 |
| DD[12] | 10.914 | 11.602 | 12.290 |

TABLE 6

EXAMPLE 2 ASPHERICAL SURFACE COEFFICIENT

| SURFACE NUMBER | 1 | 2 |
|---|---|---|
| K | 1.000000E+00 | 1.000000E+00 |
| A3 | 0.000000E+00 | 0.000000E+00 |
| A4 | 2.498982E−04 | 2.515328E−04 |
| A5 | 0.000000E+00 | 0.000000E+00 |
| A6 | −6.695187E−07 | −3.943301E−07 |
| A7 | 0.000000E+00 | 0.000000E+00 |
| A8 | 1.763736E−09 | −7.688987E−10 |
| A9 | 0.000000E+00 | 0.000000E+00 |
| A10 | 2.084136E−12 | 2.038361E−11 |

EXAMPLE 3

FIG. 3 is a diagram illustrating the lens structure of the variable magnification optical system for projection in Example 3. The variable magnification optical system for projection in Example 3 consists of negative lens group GN having negative refractive power and positive lens group GP having positive refractive power arranged in this order from the magnification side. Further, positive lens group GP consists of front group GPf having positive refractive power and rear group GPr having positive refractive power in this order from the magnification side. The variable magnification optical system for projection in Example 3 is a zoom lens of three group structure in which each of three lens groups of negative lens group GN, front group GPf and rear group GPr moves during magnification change. Negative lens group GN moves toward the reduction side, and front group GPf and rear group GPr move toward the magnification side during magnification change.

Negative lens group GN consists of first lens L1 having positive meniscus shape with its convex surface facing the reduction side in a paraxial region and second lens L2, which is a negative meniscus lens with its convex surface facing the magnification side, in this order from the magnification side. Further, front group GPf consists of third lens L3, which is a biconvex lens. Rear group GPr consists of fourth lens L4, which is a positive meniscus lens with its convex surface facing the magnification side, fifth lens L5, which is a biconcave lens, and sixth lens L6, which is a biconvex lens. Further, all of the lenses are single lenses, and both surfaces of first lens L1 are aspheric surfaces.

Figure 12:
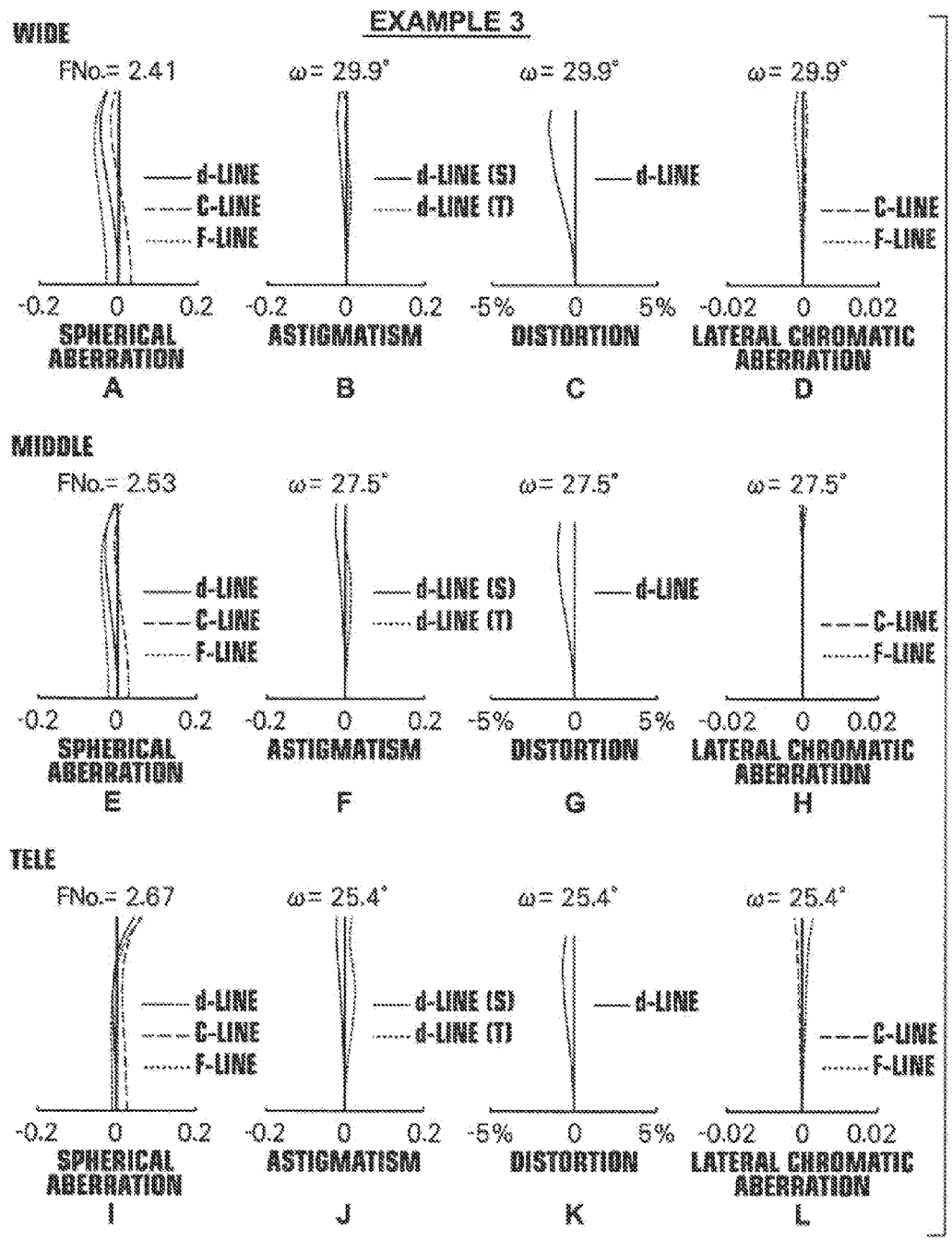
FIG. 12, Sections A through L are aberration diagrams of the variable magnification optical system for projection in Example 3 of the present invention.
Figure 13:
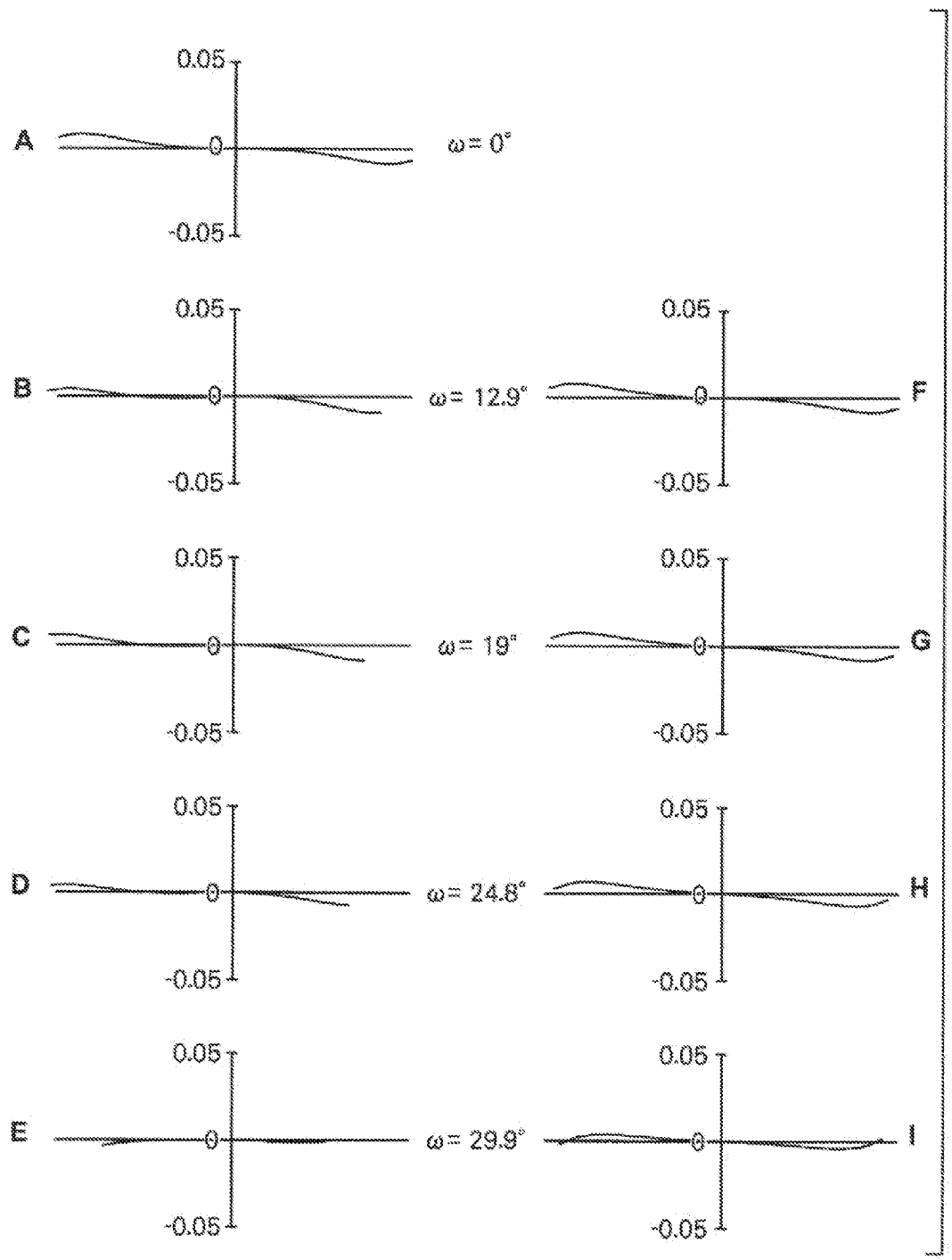
FIG. 13, Sections A through I are lateral aberration diagrams of the variable magnification optical system for projection in Example 3 of the present invention at a wide angle end.
Figure 14:
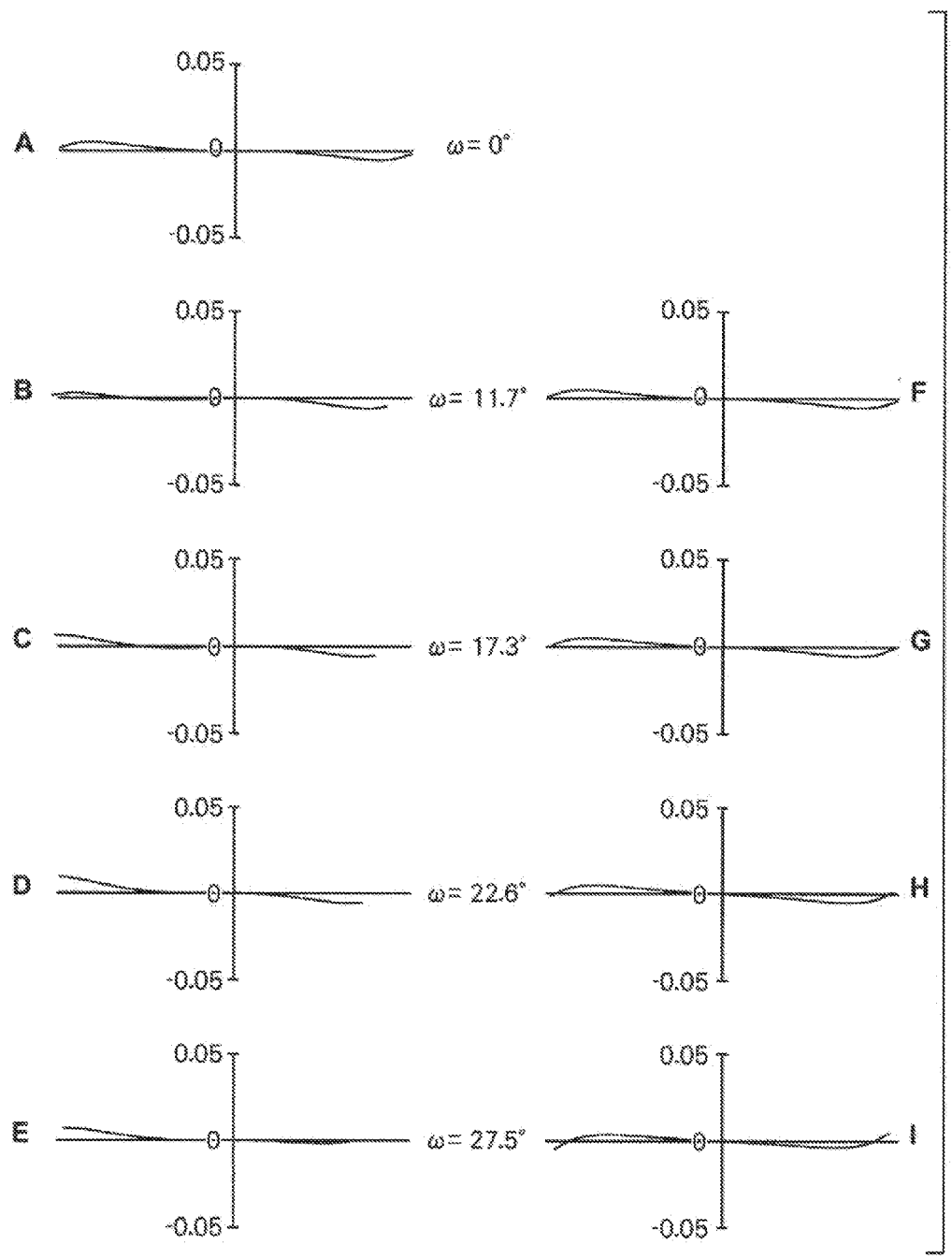
FIG. 14, Sections A through I are lateral aberration diagrams of the Variable magnification optical system for projection in Example 3 of the present invention. In a middle focal length state.
Figure 15:
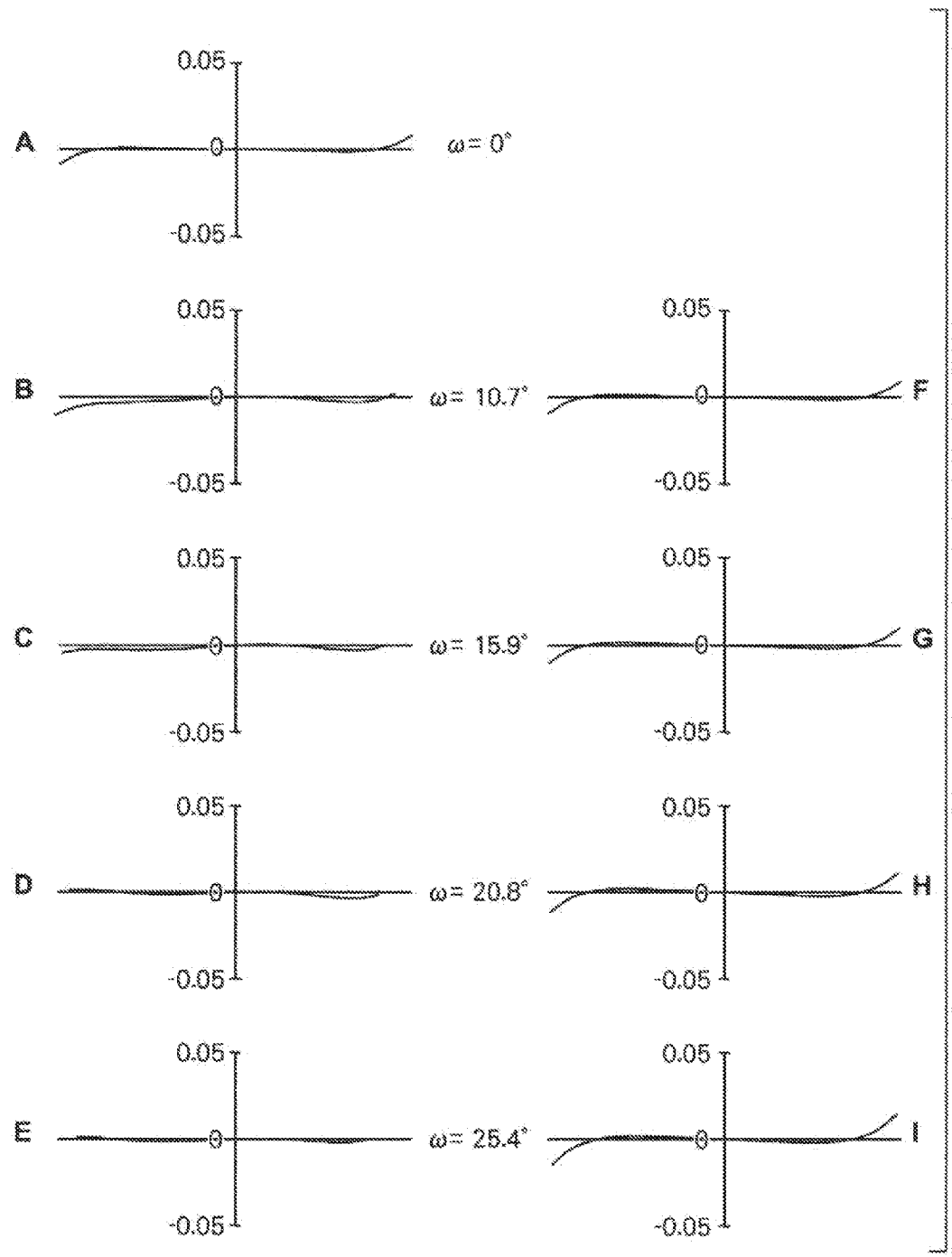
FIG. 15, Sections A through I are lateral aberration diagrams of the variable magnification optical system for projection in Example 3 of the present invention at a telephoto end.

Table 7, Table 8 and Table 9 show basic lens data on the variable magnification optical system for projection in Example 3, specification and variable surface distances, and aspherical surface coefficients, respectively. FIG. 12, Sections A though L, FIG. 13, Sections A through I, FIG. 14, Sections A through I and FIG. 15, Sections A through I illustrate aberration diagrams of the variable magnification optical system for projection in Example 3.

TABLE 7

EXAMPLE 3 BASIC LENS DATA

| Si | Ri | Di | Ndj | vdj |
|---|---|---|---|---|
| *1 | −17.988 | 2.733 | 1.49023 | 57.45 |
| *2 | −17.988 | 0.217 | | |
| 3 | 864.373 | 1.093 | 1.60311 | 60.64 |
| 4 | 12.589 | DD[4] | | |
| 5 | 16.807 | 3.276 | 1.72916 | 54.68 |
| 6 | −413.092 | DD[6] | | |
| 7 | 10.989 | 3.417 | 1.77250 | 49.60 |
| 8 | 40.339 | 0.652 | | |
| 9 | −29.099 | 1.601 | 1.80518 | 25.42 |
| 10 | 8.193 | 0.654 | | |
| 11 | 15.330 | 3.416 | 1.77250 | 49.60 |
| 12 | −18.347 | DD[12] | | |
| 13 | ∞ | 0.717 | 1.51633 | 64.14 |
| 14 | ∞ | | | |

TABLE 8

EXAMPLE 3 SPECIFICATION AND VARIABLE SURFACE DISTANCE (PROJECTION DISTANCE = 1350)

| | WIDE ANGLE END | MIDDLE | TELEPHOTO END |
|---|---|---|---|
| VARIABLE MAGNIFICATION RATIO | 1.0 | 1.1 | 1.2 |
| FOCAL LENGTH | 10.00 | 10.99 | 11.98 |
| FNo. | 2.41 | 2.53 | 2.67 |
| 2ω[°] | 59.8 | 55.0 | 50.8 |
| Bf | 11.843 | 12.446 | 13.092 |
| DD[4] | 23.226 | 20.416 | 18.025 |
| DD[6] | 5.511 | 5.986 | 6.369 |
| DD[12] | 10.948 | 11.567 | 12.229 |

TABLE 9

EXAMPLE 3 ASPHERICAL SURFACE COEFFICIENT

| SURFACE NUMBER | 1 | 2 |
|---|---|---|
| K | 1.000000E+00 | 1.000000E+00 |
| A3 | 0.000000E+00 | 0.000000E+00 |
| A4 | 2.365286E−04 | 2.417881E−04 |
| A5 | 0.000000E+00 | 0.000000E+00 |
| A6 | −6.215302E−07 | −4.888696E−07 |
| A7 | 0.000000E+00 | 0.000000E+00 |
| A8 | 1.453875E−09 | 1.692131E−10 |
| A9 | 0.000000E+00 | 0.000000E+00 |
| A10 | 8.570871E−13 | 6.879883E−12 |

Table 10 shows values corresponding to each of conditional expressions (1) through (4) for aforementioned Examples 1 through 3. All of Examples 1 through 3 satisfy conditional expressions (F) through (4).

TABLE 10

| | CONDITIONAL EXPRESSION | | | |
|---|---|---|---|---|
| | (1) $|fw/f1|$ | (2) $fw/f2$ | (3) $R2r/fw$ | (4) $FNw$ |
| EXAMPLE 1 | 0.001 | −0.416 | 1.847 | 2.40 |
| EXAMPLE 2 | 0.003 | −0.412 | 1.909 | 2.40 |
| EXAMPLE 3 | 0.014 | −0.472 | 1.258 | 2.41 |

So far, the present invention has been described by using embodiments and examples. However, the variable magnification optical system for projection of the present invention is not limited to the aforementioned examples, and various modifications of the mode are possible. For example, the curvature radius of each lens, a distance between surfaces a refractive index, an Abbe number and aspherical surface coefficients may be appropriately modified.

Further, the structure of the projection-type display apparatus of the present invention is not limited to the aforementioned structure. For example, a light valve to be used and an optical member to be used to separate rays or combine rays are not limited to the aforementioned structure, and various modifications of the mode are possible.

What is claimed is:

1. A variable magnification optical system for projection consisting of:
a negative lens group having negative refractive power; and
a positive lens group having positive refractive power in this order from a magnification side,
wherein a distance on an optical axis between the negative lens group and the positive lens group changes during magnification change, and
wherein an entire system substantially consists of six lenses, and
wherein the negative lens group consists of a first lens including an aspheric surface and a second lens that is a single lens having negative refractive power in this order from the magnification side, and
wherein the first lens is made of plastic material, and
wherein the following conditional expression (1) is satisfied:

$$|fw/f1|<0.1 \quad (1),\text{ where}$$

fw: a focal length of the entire system at a wide angle end, and
f1: a focal length of the first lens.

2. A variable magnification optical system for projection consisting of:
a negative lens group having negative refractive power; and
a positive lens group having positive refractive power in this order from a magnification side,
wherein a distance on an optical axis between the negative lens group and the positive lens group changes during magnification change, and
wherein an entire system substantially consists of six lenses, and
wherein the negative lens group consists of a first lens including an aspheric surface and a second lens that is a single lens having negative refractive power in this order from the magnification side, and
wherein the positive lens group consists of a positive lens, a positive lens, a negative lens and a positive lens in this order from the magnification side, and
wherein magnification is changed by moving the negative lens group and the positive lens group in the direction of an optical axis.

3. The variable magnification optical system for projection, as defined in claim 1, wherein the following conditional expression (1') is satisfied:

$$|fw/f1|<0.03 \quad (1').$$

4. The variable magnification optical system for projection, as defined in claim 1, wherein the following conditional expression (2) is satisfied:

$$-0.8<fw/f2<-0.25 \quad (2),\text{ where}$$

fw: a focal length of the entire system at a wide angle end, and
f2: a focal length of the second lens.

5. The variable magnification optical system for projection, as defined in claim 4, wherein the following conditional expression (2') is satisfied;

$$-0.5<fw/f2<-0.30 \quad (2').$$

6. The variable magnification optical system for projection, as defined in claim 1, wherein the following conditional expression (3) is satisfied:

$$0.7<R2r/fw<4.0 \quad (3),\text{ where}$$

R2r: a curvature radius of a reduction-side surface of the second lens, and
fw: a focal length of the entire system at a wide angle end.

7. The variable magnification optical system for projection, as defined in claim 6, wherein the following conditional expression (3') is satisfied:

$$1.0<R2r/fw<3.0 \quad (3').$$

8. The variable magnification optical system for projection, as defined in claim 1, wherein the second lens is a biconcave lens.

9. The variable magnification optical system for projection, as defined in claim 1, wherein the positive lens group consists of a front group having positive refractive power and a rear group having positive refractive power in this order from the magnification side, and
wherein the front group consists of a single lens having positive refractive power, and
wherein the rear group consists of a positive lens, a negative leas and a positive lens in this order from the magnification side, and
wherein magnification is changed by moving each of the negative lens group, the front group and the rear group in the direction of an optical axis in such a manner that a distance therebetween on the optical axis changes.

10. The variable magnification optical system for projection, as defined in claim 1, wherein both surfaces of all of the lenses in the entire system except the first lens are spherical surfaces.

11. The variable magnification optical system for projection, as defined in claim 1, wherein the following conditional expression (4) is satisfied:

$$FNw<3.0 \qquad (4),$$

where

FNw: an F-number at a wide angle end.

12. The variable magnification optical system for projection, as defined in claim 11, wherein the following conditional expression (4') is satisfied:

$$FNw<2.6 \qquad (4').$$

13. A projection-type display apparatus comprising:
a light source;
a light valve on which light from the light source is incident; and
the variable magnification optical system for projection, as defined in claim 1, as a variable magnification optical system for projection that projects an optical image of light that has been optically modulated by the light valve onto a screen.

14. A projection-type display apparatus comprising:
a light source;
a light valve on which light from the light source is incident; and
the variable magnification optical system for projection, as defined in claim 2, as a variable magnification optical system for projection that projects an optical image of light that has been optically modulated by the light valve onto a screen.

* * * * *